United States Patent
Etxebarrena Allende

(10) Patent No.: US 6,477,915 B1
(45) Date of Patent: Nov. 12, 2002

(54) TENSIONING DEVICE FOR CABLES

(75) Inventor: Rafael Etxebarrena Allende, Bilbao (ES)

(73) Assignee: Batz S. Coop, Igorre (ES)

( * ) Notice: Subject to any disclaimer, the term of this patent is extended or adjusted under 35 U.S.C. 154(b) by 0 days.

(21) Appl. No.: 09/830,517
(22) PCT Filed: Aug. 22, 2000
(86) PCT No.: PCT/ES00/00329
§ 371 (c)(1), (2), (4) Date: Aug. 3, 2001
(87) PCT Pub. No.: WO01/17830
PCT Pub. Date: Mar. 15, 2001

(30) Foreign Application Priority Data

Sep. 6, 1999 (ES) .................................. 9901989

(51) Int. Cl.⁷ ................................ F16C 1/18; F16C 1/22
(52) U.S. Cl. .................. 74/501.5 R; 74/535; 74/577 S
(58) Field of Search ..................... 74/500.5, 501.5 R, 74/512, 523, 533, 535, 538, 560, 575, 577 S

(56) References Cited

U.S. PATENT DOCUMENTS

| | | | | |
|---|---|---|---|---|
| 4,641,545 A | * | 2/1987 | Rabe ............................. | 74/538 |
| 4,819,501 A | * | 4/1989 | Kraus et al. .................... | 74/535 |
| 5,001,942 A | * | 3/1991 | Boyer ..................... | 74/501.5 R |
| 5,036,725 A | * | 8/1991 | Troiano ...................... | 74/500.5 |
| 5,067,366 A | * | 11/1991 | Gandiglio ..................... | 74/535 |
| 5,201,236 A | * | 4/1993 | Nagano ...................... | 74/500.5 |
| 5,205,184 A | * | 4/1993 | Noel et al. ..................... | 74/535 |
| 5,533,420 A | * | 7/1996 | Perisho ................... | 74/501.5 R |
| 5,546,828 A | * | 8/1996 | Golarz ......................... | 74/512 |
| 5,950,496 A | * | 9/1999 | Rampp ................... | 74/501.5 R |
| 6,016,718 A | * | 1/2000 | Park et al. ..................... | 74/538 |
| 6,073,513 A | * | 6/2000 | Huebner ...................... | 74/535 |

* cited by examiner

*Primary Examiner*—Chong H. Kim
(74) *Attorney, Agent, or Firm*—Browdy and Neimark

(57) ABSTRACT

A tension device for cables, in particular for the handbrake cable of automobile vehicles. It includes a simple mechanism with a cable finishing part (10) with a spherical end (5) that can become wedged between a disc (4) and a bowl (3) mounted on a bushing (7) on which the brake lever (9) also turns. This lever includes a ratchet (1) that travels along a toothed portion (12) of the disc (4).

7 Claims, 2 Drawing Sheets

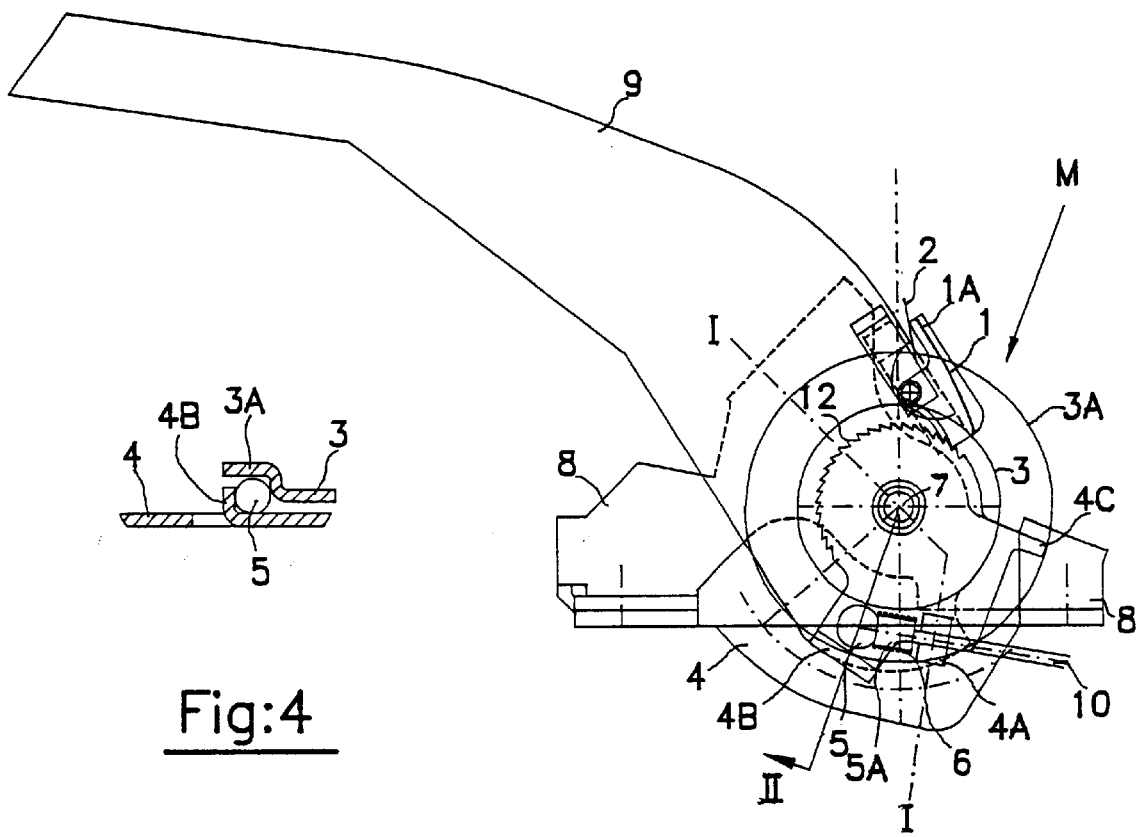
Fig:1
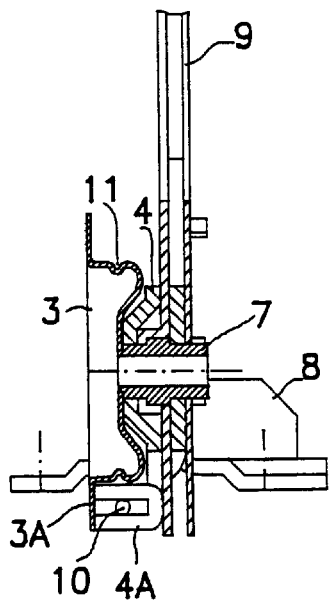
Fig:2
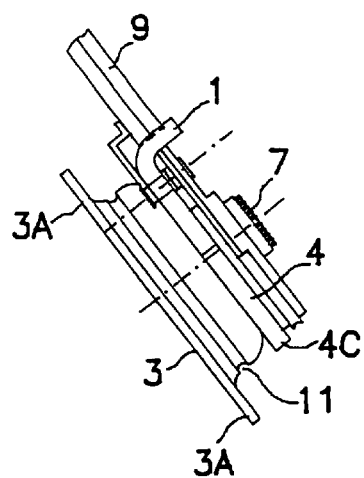
Fig:3
Fig:4

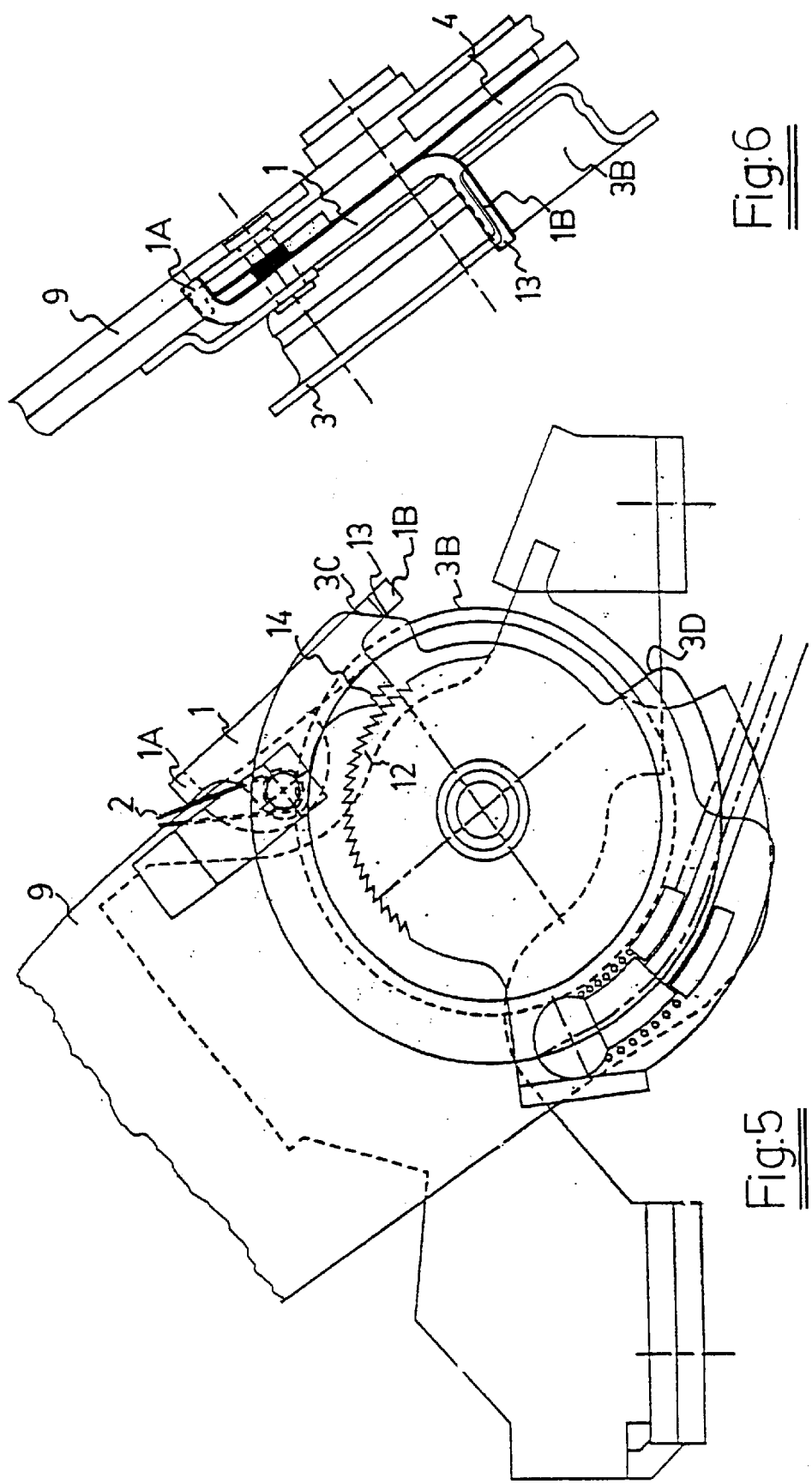

TENSIONING DEVICE FOR CABLES

REFERENCE TO RELATED APPLICATIONS

The present application is the national stage under 35 U.S.C. §371 of international application PCT/ES00/00329, filed Aug. 22, 2000, which designated the United States, and which application was not published in the English language.

BACKGROUND OF THE INVENTION

1. Technical Field of the Invention

This invention relates to a tension device for cables, in particular although not exclusively for application to the handbrakes of automobile vehicles.

2. Prior Art

The handbrakes of vehicles have a lever connected by means of diverse mechanisms to a cable that finishes at a connector, with side lines that extend towards the brake systems situated at the wheels. When the lever is operated, the side lines cause the brakes to be applied, and when the lever is released, the brakes are also released.

OBJECT AND SUMMARY OF THE INVENTION

The cable that comes from the brake lever often becomes loosened with continuous use and therefore it is necessary to fit tensioning units that maintain the tightness of the cable within pre-set values established by the manufacturer, so that correct braking of the vehicle takes place throughout the service life of the vehicle.

As far as is known by the state of the technique, there is proof of several tension systems applicable to this particular use, most of which are very complicated devices with a high number of constituent items and parts.

The fundamental objective of the present invention is to provide a tension device for cables which is very simple and effective and, moreover, eliminates the risks arising from a relative profusion of components.

Another object of the invention is to provide a tension device for cables which is quite economical to produce.

In order to achieve these objectives, the invention claims a tension device for cables equipped with a, operating lever, a disc with a portion in the shape of a circular sector and another auxiliary portion of a greater extension than the previous one.

The portion of the disc in the shape of a circular sector is mounted on a bushing, on which the brake lever also turns. It is of a certain thickness and has toothing on its circular edge that occupies a certain angle, e.g. 180 degrees.

The other portion starts from the beginning and end of the above mentioned toothed area and extends in a coplanar way to it and reaches a surface area more distant from the centre of the disc.

Prominent on this second portion are, at one end, a flat projection by way of a lug and, at the other end, a wall perpendicular to the surface of the disc that forms a vertical surface and, close to this wall, an also vertically protruding base towards the same side of the disc from which the wall protrudes.

The base is provided to be used as a seating for the end of the cable. As will be described later for the appropriate purposes, and its longitudinal direction forms an acute angle with the longitudinal direction of the wall.

The brake lever is mounted on the same bushing, which in turn is mounted on a support fixed to the vehicle itself, so that the lever turns on the bushing when required to do so by the user.

Situated forward of the disc is a bowl, also mounted on the same bushing. The opening of this bowl is towards the outside, i.e. towards the opposite side to the position of the disc, and its side surface is close to the position of the base of this disc on which the end of the cable is seated, and with the bowl also having a wide circular outer wing, that extends parallel to the lever and above the base and the vertical wall of the disc.

The side surface of the bowl is provided with an annular slot.

The end of the cable that comes from the connector is finished by a small straight cylindrical part with a spherically shaped end of a greater diameter that that of the cylinder, which receives a spring on its exterior.

The cable passes through the interior of the base of the disc, which is U-shaped for example, and the cylindrical finishing part with the spherical portion become situated between the vertical wall of the disc and the outer side surface of the bowl.

The spring rests on the base of the disc and maintains pressure against the spherical portion so as to push this spherical portion against the vertical wall of the disc.

The edge of the brake lever includes a ratchet that protrudes slightly towards the disc, so that its protruding tooth acts against the toothing on the disc.

The stop for the disc makes contact with a support point that holds the central bushing, limiting the anticlockwise travel or turning of this disc.

As mentioned previously, the lever turns on the central bushing secured to the support, the bowl is fixed to the bushing and the disc is enabled to turn on this bushing.

As will be deduced from the description so far, the cylindrical finishing part of the cable, with its. spherical end portion and the spring that is around the cylindrical portion are located in the physical space included between the base and the vertical wall of the disc, the side surface of the bowl and its protruding circular wing, so that the self-tensioning of the cable takes place in this space.

At the beginning of assembly, the tension of the spring that is around the cylindrical part of the finishing part of the cable is studied so that it corresponds to the tension that the cable must maintain in order to carry out its function on the brake mechanisms of the wheels of the vehicle.

In this position, the spherical end of the cable finishing part does not make contact with the vertical wall of the disc and with the side surface of the bowl. Thus, when the lever is turned, the disc turns with it on the central bushing and the ratchet of the lever does not act against the toothing on the disc.

When the cable becomes slacker or loses its pre-set tension due to use, the tension of the spring on the base of the disc becomes greater than the tension of the cable and therefore pushes the spherical portion against the vertical wall of the disc and against the side surface of the bowl, with this spherical portion becoming wedged between both, so that when the lever and the disc are turned, it also causes the disc to turn through a certain angle, as a consequence of which the tooth of the ratchet travels through this angle on the toothing on the disc.

In this operation, the spherical portion of the cable finishing part has also turned through this angle and has obliged the cable to be tightened, until its tension becomes the same as that of the spring of the cable finishing part. When this happens, the spherical portion loses contact with the vertical wall of the disc and with the side surface of the bowl, with the assembly returning to a position similar to its starting position, although with the ratchet housed in the toothing on the disc at a certain angular distance from its initial position.

In these tensioning operations, the disc turns in a clockwise direction, given that in the anticlockwise direction, its protruding stop makes contact with a point on the support.

As the cable again loses tension, the system takes up the slack in a self-tensioning action, with the actions describe being continually repeated and maintaining the correct tension in the cable.

The base of the disc, through which the cable passes and on which the spring of the finishing part of the said cable rests, is very close to the side surface of the bowl, with which the cable that protrudes towards the bowl becomes housed in the annular slot in the bowl after a series of self-tensioning operations of the system have occurred.

The ratchet is provided with a spring that acts against the tooth that the said ratchet is equipped with, so that the ratchet is turned for the resetting of the system by forcing the tooth.

In order to carry out this resetting, the ratchet is used in combination with a cavity cut in the side surface and in the outer wing of the bowl. The ratchet has a lug that protrudes in a perpendicular direction at one clockwise end, which becomes lodged in the previously mentioned cavity.

The cavity in the bowl provides a circular shaped edge at the base of this bowl, and extends at a certain angle of its periphery. From this edge and at the side nearer the lug on the ratchet, the wing has an edge which is not aligned with the theoretical centre of the bowl on which the said lug of the ratchet is supported and slides.

When the lever of the tension device is rotated clockwise, the lug slides on the inclined plane of the edge towards the bottom of the cavity, so that it is pushed by its spring in order to engage the teeth of the ratchet with the teeth of the central body.

On the contrary, when the lever is rotated back counterclockwise to its lowest position, the lug on the ratchet again travels from the bottom of the cavity towards the inclined area, pushing its antagonist spring, until the ratchet is raised and disengages the contact between the teeth of the ratchet and those of the central body, this bringing about the resetting of the system.

BRIEF DESCRIPTION OF THE DRAWINGS

All the details of the invention can be appreciated in greater detail on the sheets of drawings, where, without any restrictive nature, the following are represented:

FIG. 1 is an elevation of the tension device in accordance with the invention.

FIG. 2 is a central cross section of FIG. 1, along the line I—I.

FIG. 3 is a view of FIG. 1, in accordance with the direction of the arrow (M) in FIG. 1.

FIG. 4 is an end detail of the system, in accordance with the view II in FIG. 1.

FIG. 5 is an elevation of the system, showing the particulars of the connection between the ratchet and the cavity in the bowl for the resetting of the system.

FIG. 6 represents the view in accordance with (N) in FIG. 5.

DETAILED DESCRIPTION OF THE PREFERRED EMBODIMENT(S) OF THE INVENTION

Looking now at the illustration in FIG. 1, we can appreciate the support (8) for the entire system, secured to a fixed part of the vehicle, on which the central bushing (7) is mounted, with the lever (9), the disc (4) and the bowl (3) then being placed on this bushing.

The disc (4) has a circular portion equipped with teeth (12), the stop (4C) that makes contact with the support (8) in order to prevent the anticlockwise rotation of this disc, as well as the base (4A), through which the cable (10) and the vertical wall (4B) pass.

The prolongations of the longitudinal directions of the base (4A) and of the vertical wall (4B) form an acute angle, as shown.

On the base (4A) rests the spring (6) that by clamping onto the cylindrical portion (5A) of the cable finishing part (10), is capable of obliging or pushing the spherical end part (5).

One can also appreciate that the base (4A) is very close to the side surface of the bowl (3) and how the spring (6) and the finish (5, 5A) of the cable (10) remain inside the space created between the vertical wall (4B), the base (4A), the side surface of the bowl (3). Above this, the space is occupied by the protruding area (3A) of the bowl.

The position shown in this FIG. 1 corresponds to the position at the start of assembly, with the stop (4C) against a projection on the support (8) and the spherical portion not making contact with the wall (4B) and with the bowl (3), in which the tension of the cable (10) is equal to the tension at which the spring (6) has been set.

The ratchet is at the start of the teeth (12) on the disc (4), ready to act when disc (4) turns, and we can observe the antagonist spring (2) supported on the projection (1A) that pushes the tooth of the ratchet (1) against the teeth of the disc (4).

When the cable (10) becomes loosened or slackened, the spring (6) pushes the spherical portion (5) so that it becomes wedged between the vertical wall (4B) and the side surface of the fixed bowl (3), turning the disc (4) through a certain angle which is traveled by the ratchet on the toothing (12).

In FIG. 2 we can appreciate the central bushing (7) secured to the support (8), with the lever (9), the disc (4) in front of the lever and the bowl (3) in front of the disc. The wing (3A) of the bowl is over the base (4A) of the disc (4), as illustrated, and the side surface of the bowl (3) has the annular slot (11) in which the cable will be housed.

With regard to this last feature, the function of the slot (11) in the bowl is again emphasised and extended with reference to FIGS. 1 and 2. When, after continual use, the disc (4) occupies an angular position displaced in a clockwise direction to the one shown, the cable (10) protruding from the base will be housed in the previously mentioned slot (11), which will perform the function of a guide for the said cable, which will run through this slot until the point where, tangentially in relation to the side surface of the bowl, it makes its way to the connector.

In FIG. 3 we can observe the exterior of the system, with the lever (9), the bushing (7), the ratchet (1) coming from the lever, the disc (4) with its stop (4C) and the bowl (3) with its wings (3A) and the annular slot (11) of the bowl.

From FIG. 4 we can deduce how the spherical portion (5) of the cable finishing part is located inside the space provided by the disc (4), the vertical wall (4B) and the wings (3A) of the bowl. In this FIG. 4, so as to not becomes involved in greater complications, the slot in the bowl for the cable has not been illustrated.

With regard to FIGS. 5 and 6 and also to FIG. 1 in its relation with them, we point out that the resetting of the system could be carried out manually by pressing on the forward projection or lug (1A) of the ratchet so that, by overcoming the action of the spring, the teeth of the ratchet (1) lose contact with the teeth (12) of the disc (1).

However, the mechanical solution is claimed, according to which the annular cavity or gap (3B) is created in the bowl (3), one of whose ends (3C) is made inclined, by way of a ramp and as a mechanical stop for the lug (1B) on the ratchet, whereas the other end (3D) is radial:

In the position shown in FIGS. 5 and 6, the lever (9) is in a lowered position, in which there is no contact between the teeth (12) of the disc (4) and the teeth (14) of the ratchet because the ratchet is raised, with the resetting of the system thus taking place.

It can be appreciated that in this position, the lug (1B) is supported on the mechanical stop (13) that forms the inclined area (3C) of the cavity (3B) in the bowl. The spring (2) of the ratchet (1) can not move the ratchet because of this stop, and the disc (3) can not turn in an anticlockwise direction.

If, while in this position, the lever (9) is turned upwards, the ratchet (1) and the disc (4) turn with it, so that the lug (1B) on the latter slides its stop (13) over the inclined plane towards the bottom of the cavity (3B), at which time the engaging of the teeth (14) and (12) takes place.

What is claimed is:

1. A tension device for a cable comprising:

a lever (9) rotatably engaged on a bushing (7) fixed on a support (8);

a disk (4) rotatably engaged on the bushing (7) having a circular portion with teeth (12) and a protruding base (4A);

the lever (9) being releasably engaged to the disk (4) by means of a spring-biased ratchet (1) on the lever (9) to the teeth (12) on the disk (4), stop means (4C) on the disk (4) engageable with the support (8) to stop counter-clockwise rotation of the disk (4);

a cable (10) slidably engaged to the protruding base (4A) and adapted to actuate brake mechanisms on wheels of a vehicle;

a cylindrical portion (5A) and a sphere (5) fixed to a free end of the cable (10);

a circular bowl (3) fixed on the bushing (7) having a recess (3B) on an outer circumference thereof;

the ratchet (1) having a lug (1B) which rides in the recess (3B) when lever (9) is rotated clockwise to engage the teeth (12) on the disk (4) and on the outer circumference when the lever (9) is rotated counterclockwise to disengage from the teeth (12) on the disk (4), wherein a spring (6) on the cylindrical portion (5A) is compressed between the protruding base (4A) and the sphere (5) when the cable (10) is initially engaged between the disk (4) and the brake mechanism and the stop means (4C) is engaged to the support (8), wherein the sphere (5) is wedged between a wall (4B) on the disk (4) and a side surface of the bowl when the cable (10) slackens, and wherein the tension of the cable (10) is reset after slackening by rotating the lever clockwise.

2. The tension device according to claim 1, wherein the base (4A) includes a passage for the cable (10) between the cylindrical portion (5A) on the free end of the cable (10) and the brake mechanism.

3. The tension device according to claim 1, wherein the ratchet (1) has teeth that engage the teeth (12) on the disk (4).

4. The tension device according to claim 1, wherein the lever (9), the disk (4) and the bowl (3) are located side-by-side on the bushing (7).

5. The tension device according to claim 1, wherein a diameter of the sphere (5) is greater than that of the cylindrical portion (5A).

6. The tension device according to claim 1, wherein the spring (6) encircles the cylindrical portion (5A).

7. The tension device according to claim 1, wherein the bowl (3) has a circular slot (11) which receives the cable (10) when tension of the cable (10) is reset.

* * * * *